United States Patent [19]

Keuerleber et al.

[11] Patent Number: 5,447,288
[45] Date of Patent: Sep. 5, 1995

[54] ELECTROMAGNETIC VALVE

[75] Inventors: Horst Keuerleber, Eberdingen; Werner Brehm, Hemmingen; Klaus Schudt, Nordheim; Markus Deeg, Schieberdingen, all of Germany

[73] Assignee: Robert Bosch GmbH, Stuttgart, Germany

[21] Appl. No.: 268,263

[22] Filed: Jun. 29, 1994

[30] Foreign Application Priority Data

Jul. 23, 1993 [DE] Germany ............... 43 24 781.4

[51] Int. Cl.6 ................................ F16K 31/06
[52] U.S. Cl. ..................... 251/129.17; 251/129.16
[58] Field of Search ............. 251/129.15, 129.16, 251/129.17

[56] References Cited

U.S. PATENT DOCUMENTS

| | | | |
|---|---|---|---|
| 2,461,772 | 2/1949 | Ray | 251/129.16 |
| 3,001,757 | 9/1961 | Ball | 251/129.16 |
| 5,240,227 | 8/1993 | Sich | 251/129.16 |

FOREIGN PATENT DOCUMENTS 2133433  1/1973  Germany ............... 251/129.16

Primary Examiner—Robert G. Nilson
Attorney, Agent, or Firm—Michael J. Striker

[57] ABSTRACT

An electromagnetic valve, in particular switching or pressure regulating valve for an automatic transmission of motor vehicles has a magnet housing, a magnet coil with a coil body received in the magnet housing, a valve member, a magnet armature through which the magnet coil cooperates with the valve member, a valve closing part connected with the magnet housing, electrical contacts for controlling the magnet coils and arranged outside of the magnet housing, and conductors extending through the magnet housing and connecting the electrical contacts with the magnet coil. The magnet housing is composed of at least two magnet casing elements, including a first magnet casing element and also a second magnet casing element which at least partially overlaps the first magnet casing element, at least one of the magnet casing elements having a recess through which the conductors extend to the electrical contacts.

7 Claims, 2 Drawing Sheets

ELECTROMAGNETIC VALVE

BACKGROUND OF THE INVENTION

The present invention generally to an electromagnetic valves.

More particularly, it relates to an electromagnetic valve such as a switching or pressure regulating valve for an automatic transmission of motor vehicles, which has a magnet housing for receiving a magnet coil with a coil holder cooperating through a magnet armature with a valve member, and with a valve closing part mounted on the magnet housing.

An electromagnetic valve of the above mentioned general type is disclosed for example in the German document DE-GM 90 17 107. For controlling the magnet coil arranged in the magnet housing of such valves connecting contacts are provided which are connected with the magnet coil through conductors extending beyond the magnet housing. The mounting of the electrical contacts in the electromagnetic valve is performed at the side of the magnet housing which is opposite to the valve closing part or at its outer periphery. The arrangement of the electric contacts at the end side of the magnet housing requires relatively high manufacturing expenses, since several mounting steps are needed. Moreover, such end-side arrangement of the electrical contacts is not recommended for all applications. Also, peripheral arrangement of the electrical contacts in conventional electromagnetic valves leads to a substantial manufacturing expense. Moreover, the magnet housing in the region of the conductors in the conventional electromagnetic valves is weakened substantially for providing efficient mounting in series production by shaping the magnet casing or magnet housing.

SUMMARY OF THE INVENTION

Accordingly, it is an object of the present invention to provide an electromagnetic valve, in particular a switching or pressure regulating valve for an automatic transmission of motor vehicles, which avoids the disadvantages of the prior art.

In keeping with these objects and with others which will become apparent hereinafter, one feature of the present invention resides, briefly stated, in an electromagnetic valve in which the magnet housing is composed at least of a first magnet casing element and a second magnet casing element which at least partially overlaps the first magnet casing element, and at least one of the magnet casing elements has a recess through which the conductors extend to the electrical contacts.

When the electromagnetic valve is designed in accordance with the present invention it has the advantage that the electrical contacting, or in other words the connection of the magnet coil with the electrical contacts is substantially simplified and is obtained with a substantially lower number of mounting steps. Moreover, due to the construction of the magnet housing in accordance with the present invention, a higher magnetic iron cross-section is provided in the region of the passage to the electrical contacts. The weakening of the magnet housing in the region of the conductors is minimized.

In accordance with a further embodiment of the present invention, the magnet casing elements are cylindrical. Therefore the magnet housing can be produced and assembled in an especially simple manner, since both individual elements are easily insertable into one another. Thereby a greater magnetic cross-section is obtained with respect to the single element, and due to end-side open construction of the section the conductors for the electrical contacts or the magnet coil are insertable in one another.

In accordance with a further especially advantageous embodiment of the invention, both magnet casing elements are provided with a groove. Thereby, a great overlapping region of both magnet casing elements is guaranteed and as a result a greater magnetic cross-section is provided.

When the electrical contact is formed as a pressure contact with a contact direction corresponding to the closing direction of the valve closing part, the mounting process of the electromagnetic valve in situ is facilitated. The reason is that hydraulic and electrical connections can be provided in one working step.

It is further especially advantageous when the magnet housing or the magnet casing elements are embedded in a synthetic plastic body, for example injection molded synthetic plastic. As a result, the magnet space can be sealed in a simple manner. Also, a very accurate association of the electrical contacts with the vale closing part is provided, since its distance or the spatial association is guaranteed by the molding process or the embedding in the synthetic plastic body. Moreover, during the embedding of the magnet housing in the synthetic plastic body, projections or ribs can be formed to engage or support the electrical contacts. Due to the synthetic plastic casing over the magnet housing elements, they are fixedly and reliably connected with one another without expensive connection steps, such as riveting or welding. Due to the embedding of the magnet housing or the magnet coil, heat can be withdrawn easier in the region of the electromagnetic valve, or in other words a higher power tightness of the electromagnetic valve can be obtained.

It is further especially advantageous when the magnet casing elements have cutouts formed so that at least some of them overlap one another in the mounted condition. Due to the embedding in the synthetic plastic body, the synthetic plastic mass also fills the cutouts, and therefore in the region of the electromagnetic valve no position changes of both individual parts can occur. Also, an eventual heat expansion of the synthetic plastic will not lead to a position change of the individual parts.

In accordance with another feature of the present invention, the magnet casing elements are formed as deep-drawn structural parts. In this case the electromagnetic valve can be produced in a simple and inexpensive manner.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
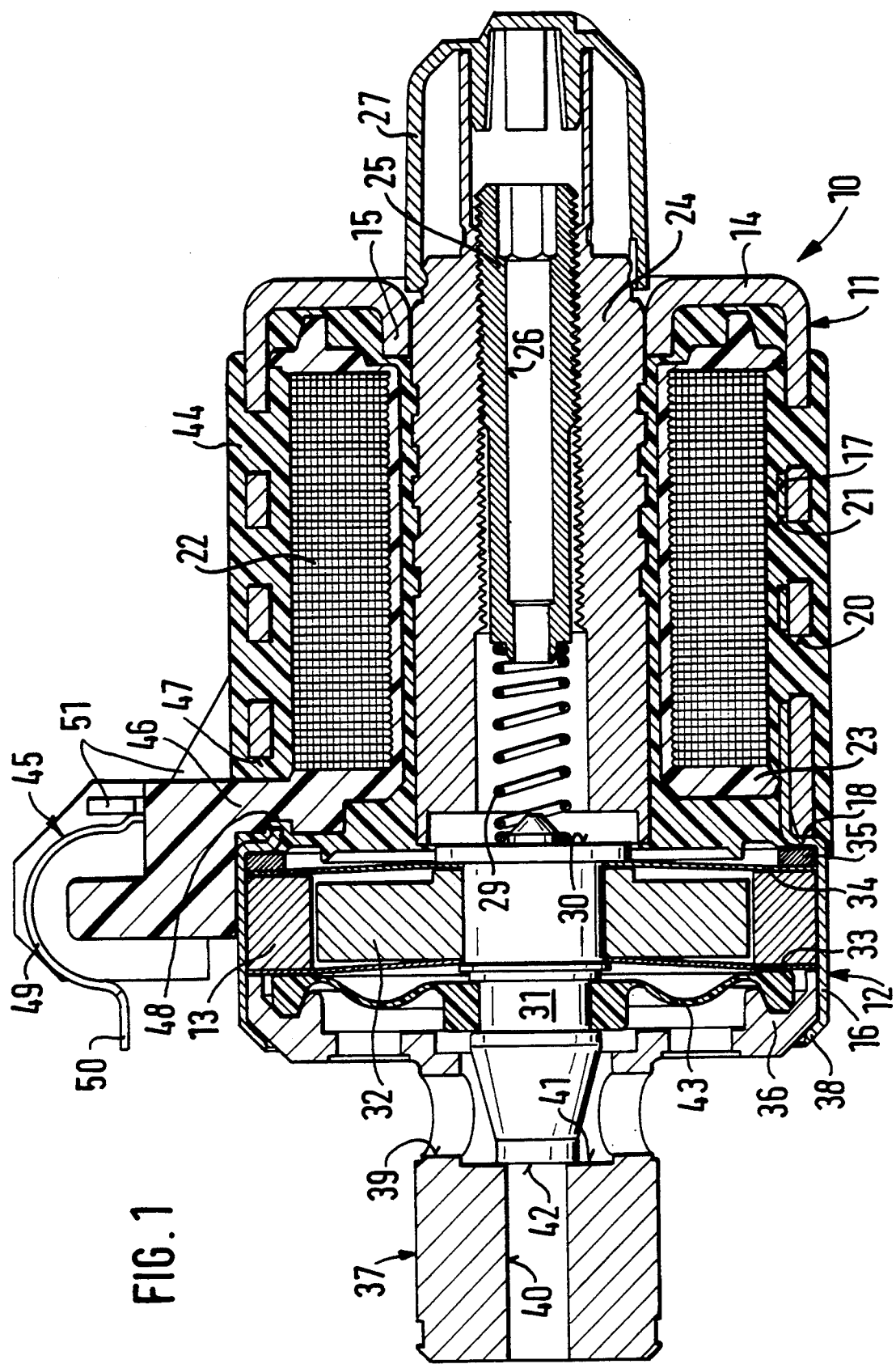
FIG. 1 is a view showing a longitudinal section of an electromagnetic valve in accordance with the present invention, which is formed as a proportional pressure regulating valve.
Figure 2:
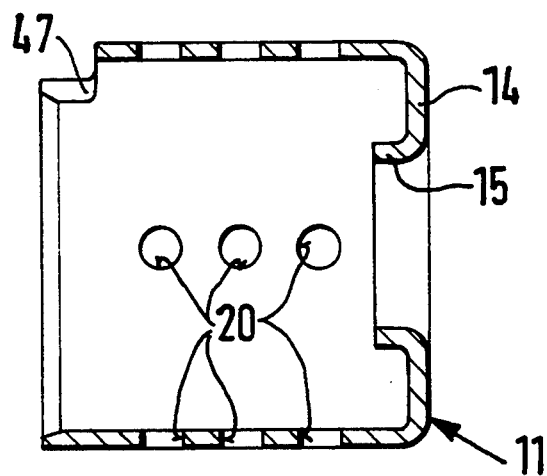
FIGS. 2 and 3 are views showing sections of the electromagnetic valve of the present invention, taken through both magnet casing elements of a magnet housing.
Figure 3:
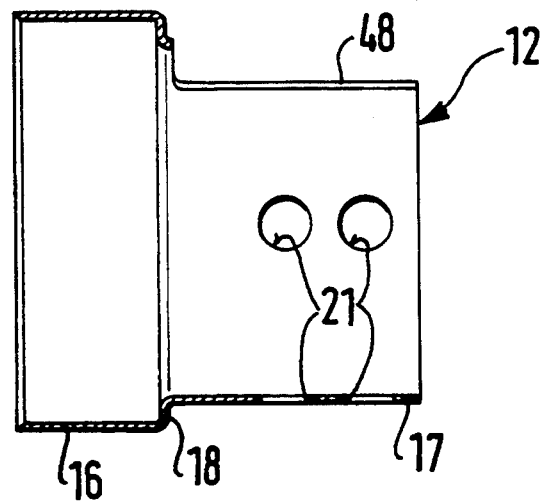

FIG. 1 shows an electromagnetic valve in accordance with the present invention which is formed as a pressure regulating valve. The electromagnetic valve 10 has a magnet housing 10 composed substantially of two magnet casing elements 11 and 12 and a flux conducting ring 13. The first magnet casing element 11 is substantially cup-shaped and has at its bottom 14 a drawn, collar-like opening 15. The second magnet casing element 12 is substantially sleeve-shaped and is composed of two cylindrical portions 16 and 17 having different diameters with a step 18 therebetween. The cylindrical portion 17 of a smaller diameter extends into the interior of the first magnet casing element 11 and abuts against its inner side. Simultaneously, the step 18 of the second magnet casing element 12 abuts against the free end side of the first magnet casing element 11. The first magnet casing element 11 and the second magnet casing element 12 are provided in their overlapping regions with throughgoing openings 20 and 21. In mounted condition the openings 20 and 21 are in alignment with one another, and the openings 20 in the first magnet casing element 11 have a somewhat smaller diameter.

A magnet coil 22 with a coil body 23 is inserted in the interior of the magnet housing 10. The magnet coil 22 and its coil body 23 surround a hollow-cylindrical magnet core 24. The magnet core extends at one side through the opening 15 in the bottom 14 and at the other side to the region of step 18. An adjusting screw 25 is inserted in the magnet core 24 and has a longitudinal opening 26. In the region of the bottom 14, the adjusting screw 25 or the end side of the magnet core 24 is covered by an injection molded protective cover 27.

A spring 29 is guided in the interior of the magnet core 24. Its one end side abuts against the adjusting screw 25 and its another end side abuts against a lower side 30 of a valve plunger 31. The valve plunger 31 extends through a disc-shaped magnet armature 32 and is connected with it. The magnet armature 32 is guided in the interior of the flux conducting ring 13. Disc-shaped diaphragm springs 33 and 34 abut against the valve plunger 31 or the end sides of the magnet armature 32. The outer periphery of the diaphragm springs 33 and 34 abuts against the end sides of the flux conducting ring 13. The right diaphragm 34 in the drawing abuts against a ring 35 which in turn abuts in the interior of the cylinder portion 16 of the second magnet element 12 against the step 18. The left diaphragm spring 33 in the drawing is pressed by a flange-like edge 36 of a valve closing element 37 against the flux conducting ring 13. The flange-like edge 36 of the valve closing element 37 is inserted in the interior of the cylinder portion 16 of the second magnet casing element 12 and is fixedly connected with the magnet housing 10 by turning of the free edge 38.

A stepped longitudinal opening 40 extends through the valve closing element 37, and a flat valve seat 41 is formed in it. The valve plunger 31 abuts with its free end side 42 against the valve seat 41 under the action of the spring 29. A transverse opening 39 extends through the longitudinal opening 40 between the valve seat 41 and the flange-like edge 36.

The inner chamber of the flux conducting ring 13 which receives the magnet armature 32 is sealed from the valve closing element 37 or the longitudinal opening 40 by a sealing diaphragm 43. The sealing diaphragm on the one side surrounds the valve plunger 31 and on the other side is clamped between the flange-like edge 36 of the valve closing element 37 and the flux guiding ring 13.

The magnet housing 10, or in other words the first magnet casing element 11 and the cylinder portion 17 as well as the step 18 of the second magnet casing element 12, the coil 22 and its coil body 23, and the magnet core 24 are embedded in a synthetic plastic body 44 composed of an injection molded plastic. The magnet coil 22 for controlling is connected with an electrical contact 45 located outside of the magnet housing 10 through conductors 46 extending outwardly beyond the magnet housing 10. The conductors 46 are embedded in the synthetic plastic mass of the coil body 23 and surrounded by both magnet casing elements 11 and 12. For this purpose the first magnet casing element 11 is provided on its outer periphery with a substantially rectangular groove 37 in a plan view, which extends from its free end side. The second magnet casing element 12 also has a recess 48 in the region of the step 18 and the cylinder portion 17 of the smaller diameter. The recess 48 extends from the free end side of the cylinder portion 17. Both recesses 47 and 48 in both magnet casing elements 11 and 12, which are open at an end side, surround or enclose the conductors 46 or the surrounding portion of the coil body 23 in the mounted condition.

The electrical contacts 45 have an arcuate, springy portion 49 which merges into a contact pin 50. The contact pin 50 and the arcuate portion 49 are formed as a pressure contact. In other words, the contacting direction of the electrical contact 45 corresponds to the contacting direction of the valve closing element 37. During insertion of the electromagnetic valve in situ, simultaneously the hydraulic connection and the electrical connection are produced. Due to the spring action of the arcuate portion 49, sufficiently high contact forces of the contact pin 50 relative to the counter contacts are guaranteed. For absorbing the forces or deformations occurring during the contacting of the electric contact 45, a supporting element 51 can be formed on the synthetic plastic body 44 for the electrical contacts.

For mounting the electromagnetic valve both magnet casing elements 11 and 12 are plugged into one another so that they receive the magnet coil 22 and enclose the region of the conductors 23 by the recesses 47 and 48. The magnet casing elements 11 and 12 and the magnet coil 22 as well as the magnet core 24, are subsequently inserted in an injection casting mold and the synthetic plastic body 44 is injected around them. In the thusly formed magnet housing, in the region of the cylinder portion 16 of the second magnet casing element 12, the ring 35, the flux conducting ring 13 with the diaphragm springs 33 and 34 and the magnetic armature 32 mounted on it together with the valve plunger 31 are inserted, so that the ring 35 and the flux conducting ring 13 are supported on the step 18. Then, the flange-like edge 36 of the valve closing element 37 is inserted into the cylinder portion 16 so that the flux conducting ring 13 and the ring 35 are pressed against the step 18 and simultaneously the sealing diaphragm 43 is clamped. By flanging the free end 38 of the cylinder portion 16, a fixed connection is provided.

Then the spring 29 is inserted in the interior of the magnet core 24 so that it abuts against the valve plunger 31 and is prestressed by the adjusting screw 25. The adjusting screw 25 which is adjusted in correspondence with specific requirements is subsequently closed by the injected protective cover 27.

Due to the above described construction of both magnet casing elements 11, 12, despite the slotting on the outer periphery, a greater magnetic cross-section is produced since only relatively short material removals are provided, and due to the double wall a thicker cross-section is possible. In the connecting region of the magnet casings with the valve closing element, no slotting in the region of the outer periphery is required and therefore a higher strength and tightness of the flanging location is insured.

It will be understood that each of the elements described above, or two or more together, may also find a useful application in other types of constructions differing from the types described above.

While the invention has been illustrated and described as embodied in an electromagnetic valve, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electromagnetic valve, in particular switching or pressure regulating valve for an automatic transmission of motor vehicles, comprising a magnet housing; a magnet coil with a coil body received in said magnet housing; a valve member; a magnet armature through which said magnet coil cooperates with said valve member; a valve closing part connected with said magnet housing; electrical contacts controlling said magnet coil and arranged outside of said magnet housing; conductors extending through said magnet housing and connecting said electrical contacts with said magnet coil, said magnet housing being composed of at least two magnet casing elements, including a first magnet casing element and also a second magnet casing element which at least partially overlaps said first magnet casing element which together form said magnet housing, at least one of said magnet casing elements having a recess through which said conductors extend to said electrical contacts; and a synthetic plastic body in which said magnet casing elements are embedded and by which said magnet casing elements are connected with one another, said magnet casing elements have openings arranged so that at least some of said openings in a mounted condition of the valve overlap one another.

2. An electromagnetic valve as defined in claim 1, wherein said magnet casing elements are cylindrical, said recess being formed on an outer periphery of said one magnet casing element and open at one side.

3. An electromagnetic valve as defined in claim 1, wherein at least one of said magnet casing elements is formed as a deep-drawn structural part.

4. An electromagnetic valve as defined in claim 1, wherein said valve closing part is flanged so as to be connected with one of said magnet casing elements.

5. An electromagnetic valve as defined in claim 1, wherein said openings of one of said casing elements and said openings of another of said casing elements are in alignment with one another.

6. An electromagnetic valve as defined in claim 1, wherein said electrical contacts and said valve closing part extend in a same direction, so that when the electromagnetic valve is inserted in a device simultaneously an electrical connection is established by said electrical contacts and a hydraulic connection is established by said valve closing part.

7. An electromagnetic valve, in particular switching or pressure regulating valve for an automatic transmission of motor vehicles, comprising a magnet housing; a magnet coil with a coil body received n said magnet housing; a valve member; a magnet armature through which said magnet coil cooperates with said valve member; a valve closing part connected with said magnet housing; electrical contacts controlling said magnet coil and arranged outside of said magnet housing; conductors extending through said magnet housing and connecting said electrical contacts with said magnet coil, said magnet housing being composed of at least two magnet casing elements, including a first magnet casing element and also a second magnet casing element which at least partially overlaps said first magnet casing element, at least one of said magnet casing elements having a recess through which said conductors extend to said electrical contacts, said magnet casing elements are each provided with said recess.

* * * * *